United States Patent [19]

Kranz et al.

[11] Patent Number: 4,630,351
[45] Date of Patent: Dec. 23, 1986

[54] MAKING CLAD SEAMLESS PIPES

[75] Inventors: Eckhard Kranz, Meerbusch; Karl Düren, Duisburg, both of Fed. Rep. of Germany

[73] Assignee: Mannesmann AG, Duesseldorf, Fed. Rep. of Germany

[21] Appl. No.: 317,132

[22] Filed: Nov. 2, 1981

[30] Foreign Application Priority Data

Nov. 24, 1980 [DE] Fed. Rep. of Germany ....... 3044589

[51] Int. Cl.$^4$ ............................................. B23P 17/00
[52] U.S. Cl. .................................. 29/527.2; 29/527.7; 29/DIG. 11; 164/98; 228/155; 228/158
[58] Field of Search ................ 29/527.2, 527.4, 426.2, 29/527.6, 527.3, 557, 527.5, 527.7, DIG. 11; 164/98, 99; 228/126, 161, 173 F, 155, 174, 158

[56] References Cited

U.S. PATENT DOCUMENTS

| 1,552,040 | 9/1925 | Fowle et al. | 29/527.3 X |
| 1,987,201 | 1/1935 | McAllister | 29/527.6 |
| 2,438,405 | 3/1948 | Kinnear, Jr. | 164/99 X |
| 3,509,617 | 5/1970 | Winter | 228/126 |
| 4,043,023 | 8/1977 | Lombard | 29/527.6 |

FOREIGN PATENT DOCUMENTS

| 1777114 | 4/1970 | Fed. Rep. of Germany . |
| 1758190 | 1/1971 | Fed. Rep. of Germany . |
| 2003607 | 8/1971 | Fed. Rep. of Germany . |

Primary Examiner—Howard N. Goldberg
Assistant Examiner—R. S. Wallace
Attorney, Agent, or Firm—Ralf H. Siegemund

[57] ABSTRACT

Rounds are clad by weld-depositing austenitic materials on the outside and, subsequently, an axial bore is drilled, followed by extrusion or cold-pilger-rolling or both. The cladding layer and the bore diameter must follow particular rules, the ferrite content of the clad material must not exceed 50%, preferably not 10%.

5 Claims, 1 Drawing Figure

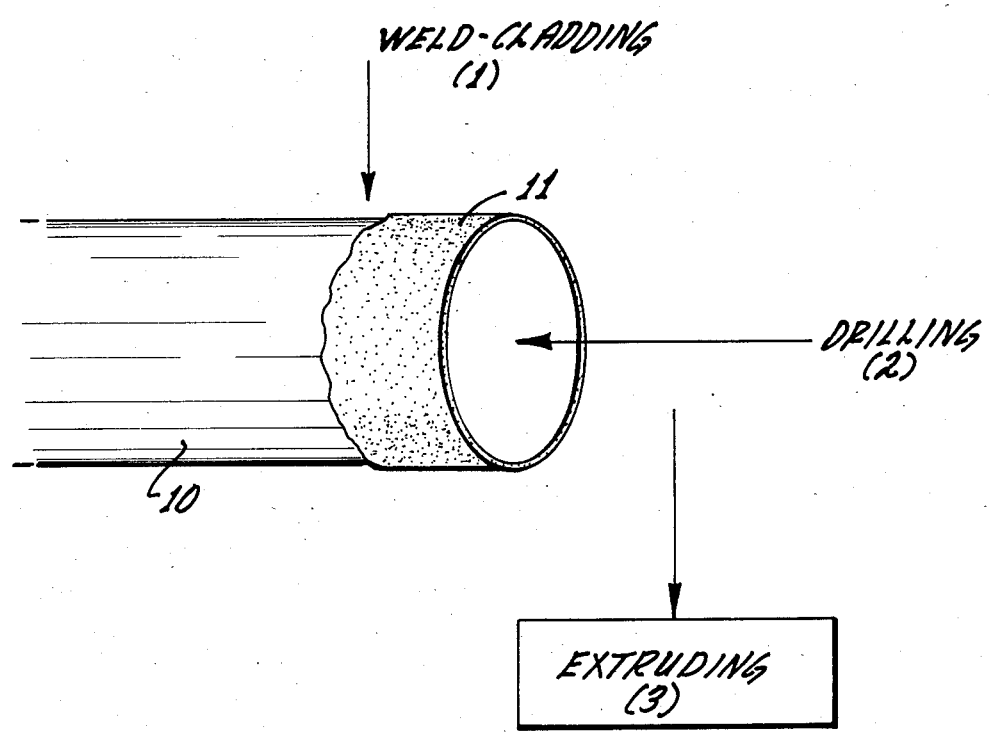

MAKING CLAD SEAMLESS PIPES

BACKGROUND OF THE INVENTION

The present invention relates to the making of cladded, seamless steel tubes or pipes.

German printed patent applications Nos. 17 58 190 and 20 03 607 describe a variety of ways to prepare a blank to be worked into a clad tube. German printed patent application No. 17 77 114 proposes to place one tube inside another one and to bond them through expansion (of the inner one) or reduction (of the outer one). All of these methods refer primarily to cladding the inside of tubing.

Problems have arisen in all of these cases, particularly when applied for outside cladding of blanks to be processed further. The metallic bond between base metal and cladding material was found to be insufficient. An insufficient bond results, for instance, from differentials in the thermal coefficients of expansion. If the outer cladding, upon heating, expands more a gap may readily form between cladding layer and base. It can readily be seen that the exact same property, namely larger expansion of the cladding material, works favorably for inside cladding as the material is forced into more intimate contact with the base.

DESCRIPTION OF THE INVENTION

It is an object of the present invention to provide a new and improved method for cladding blanks to be worked into hollows subsequently and having a cladding layer on the outside.

It is another object of the present invention to improve the making of clad blanks to be worked subsequently into tubes or pipes by means of extrusion, cold-pilger-rolling, or both.

It is a further object of the present invention to provide clad steel blanks in which the bonding between cladding material and base is free from deficiencies, even if the blank is subsequently worked at temperatures in excess of 200° C.

In accordance with the preferred embodiment of the present invention, it is suggested to provide a blank and clad same by means of weld-depositing, the cladding material to have a ferrite content not exceeding 50% and the layer so created not exceeding one-fifth of the diameter of the blank. The clad blank is then axially drilled, the resulting bore having a diameter of approximately ⅓rd to ⅕th of the blank diameter. The thus prepared blank may now be extruded or cold-pilger-rolled, or both. In the preferred form, the cladding material is austenitic at less than 10% ferrite. Moreover, the cladding material is preferably Ta/Nb stabilized.

The combination of steps, at least some being known per se, permits the manufacture of pipes and tubes with an outer cladding that is not affected by the process as to the metallic bonding to the base material of the pipe. Differences in thermal expansion do not interfer with the resulting product and its making in a detrimental fashion.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

The FIGURE illustrates somewhat schematically the process in accordance with the preferred embodiment of the invention for practicing the best mode thereof.

Proceeding to the detailed description of the drawings, the FIGURE illustrates a round 10 made of steel St 35 and having, for example, a diameter of 177 mm. This particular round is to serve as a base for a subsequent cladding process.

In a first example, a cladding layer 11 is provided at a thickness of 12 mm and built up by means of weld depositing. The material is to be austenitic material of chromium-nickel-manganese 18/8/6. The composition is preferably stabilized by a Ta/Nb system.

In a second, alternative example, one may weldclad a layer onto round 10, being an austenitic chromium-nickel-niobium steel 21/10 having a ferrite content not exceeding 50%, preferably not 10%. That layer may also be approximately 12 mm thick.

In either case, a bore is subsequently drilled into the round, along the axis thereof, in order to obtain a hollow blank. The diameter of the drilled bore should be approximately ⅓rd to ⅕th of the original diameter of the round (assumed to be 177 mm in this case).

Next, the clad round with either one of the layers is extruded in a suitable extruder, to obtain a tube or pipe having dimensions of 63.5 mm by 7.25 mm with a clad layer thickness of 1.2 mm. Extrusion may not necessarily involve final dimensions, but cold-pilgering (reciprocating rolling) may follow the extrusion to size the tube. In either case, reducing work is performed on the clad blank, and the temperature may well exceed 200° C. At such a temperature, the difference in thermal expansion of the cladding material and of the core (unclad tube) becomes noticeably effective; but the metal bond between the base core and the cladding material does hold.

Following surface finish, it was found that the bond between the clad material and the core or base was intimately metallic throughout. Testing by means of ultrasonics, bending, and torsion as well as metallographic tests in the bonding plane (cylinder) yielded the satisfactory result of a good bond throughout.

The invention is not limited to the embodiments described above; but all changes and modifications thereof, not constituting departures from the spirit and scope of the invention, are intended to be included.

We claim:

1. Method of cladding steel tubes or pipes on the outside, comprising the steps of
   providing a steel blank;
   weld depositing a high-alloyed cladding material with a ferrite content not exceeding 50% onto the blank, an outer diameter of the blank being at least five times the thickness of the welded-on material;
   drillig a bore into the blank at a diameter range of ⅕th to ⅓rd the blank diameter to obtain a tubular body; and
   extruding the resultiing tubular body toward obtaining desired dimensions.

2. Method of preparing hollows for purposes of subsequent cold-pilger-rolling or extrusion or both, comprising the steps of
   providinig a steel blank;
   weld depositing a high-alloyed cladding material with a ferrite content not exceeding 50% onto the blank, a diameter of the blank being at least five times the thickness of the welded-on material; and drilling a bore into the blank at a diameter range of ⅛th to ⅓rd the blank diameter to obtain a hollow.

3. Method of cladding steel tubes or pipes on the outside, comprising the steps of providing a steel blank;

weld depositing a high-alloyed cladding material with a ferrite content not exceeding 50% onto a blank, an outer diameter of the blank being at least five times the thickness of the welded-on material;

drilling a bore into the blank at a diameter to obtain a tubular body of from ⅛th to ⅓rd the blank diameter; and cold-pilger-rolling the resulting tubular body toward obtaining desired dimensions.

4. Method as in claim 1 or 2 or 3, the cladding material being austenitic at a ferrite content not exceeding 10%.

5. Method as in claim 1 or 2 or 3, the cladding material being Ta/Nb stabilized.

* * * * *